(12) United States Patent
Srivastava et al.

(10) Patent No.: US 7,165,190 B1
(45) Date of Patent: Jan. 16, 2007

(54) METHOD AND MECHANISM FOR MANAGING TRACES WITHIN A COMPUTER SYSTEM

(75) Inventors: Alok Kumar Srivastava, Newark, CA (US); Ivan Tinlung Lam, Santa Clara, CA (US); Sunil Kumar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 510 days.

(21) Appl. No.: 10/208,129

(22) Filed: Jul. 29, 2002

(51) Int. Cl.
*G06F 11/00* (2006.01)

(52) U.S. Cl. ............................ 714/38; 714/47; 717/128

(58) Field of Classification Search ................ 717/128; 714/37, 38, 47
See application file for complete search history.

(56) References Cited

U.S. PATENT DOCUMENTS

| | | | |
|---|---|---|---|
| 3,707,725 A | 12/1972 | Dellhelm | |
| 4,462,077 A * | 7/1984 | York | 714/45 |
| 5,537,319 A | 7/1996 | Schoen | |
| 5,594,904 A | 1/1997 | Linnermark et al. | |
| 5,649,085 A | 7/1997 | Lehr | |
| 5,689,636 A * | 11/1997 | Kleber et al. | 714/45 |
| 5,708,825 A | 1/1998 | Sotomayor | |
| 5,870,606 A * | 2/1999 | Lindsey | 717/128 |
| 5,896,536 A * | 4/1999 | Lindsey | 717/128 |
| 5,920,719 A | 7/1999 | Sutton et al. | |
| 5,963,740 A | 10/1999 | Srivastava et al. | |
| 6,026,362 A | 2/2000 | Kim et al. | |
| 6,083,281 A * | 7/2000 | Diec et al. | 717/128 |
| 6,164,841 A * | 12/2000 | Mattson et al. | 716/1 |
| 6,189,141 B1 * | 2/2001 | Benitez et al. | 717/153 |
| 6,202,099 B1 | 3/2001 | Gillies et al. | |
| 6,202,199 B1 | 3/2001 | Wygodny et al. | |
| 6,282,701 B1 | 8/2001 | Wygodny et al. | |
| 6,289,503 B1 | 9/2001 | Berry et al. | |
| 6,311,326 B1 | 10/2001 | Shagam | |
| 6,338,159 B1 | 1/2002 | Alexander, III et al. | |
| 6,339,775 B1 | 1/2002 | Zamanian et al. | |
| 6,349,406 B1 | 2/2002 | Levine et al. | |
| 6,351,844 B1 | 2/2002 | Bala | |
| 6,353,898 B1 | 3/2002 | Wipfel et al. | |
| 6,353,924 B1 | 3/2002 | Ayers et al. | |
| 6,470,349 B1 | 10/2002 | Heninger et al. | |
| 6,480,886 B1 | 11/2002 | Paice | |
| 6,507,805 B1 | 1/2003 | Gordon et al. | |
| 6,513,155 B1 | 1/2003 | Alexander, III et al. | |
| 6,546,548 B1 | 4/2003 | Berry et al. | |

(Continued)

OTHER PUBLICATIONS

Helmbold, D.P. et al. "Detecting Data Races from Sequential Traces" IEEE (1991) pp. 408-417.

(Continued)

*Primary Examiner*—Scott Baderman
*Assistant Examiner*—Paul F. Contino
(74) *Attorney, Agent, or Firm*—Bingham McCutchen LLP (57) ABSTRACT

A method and mechanism for managing traces with a computer system having a plurality of resources is disclosed. One or more conditions can be established for the computer system. The resources may then be monitored to determine whether the computer system has reached the one or more conditions. If so, then the parameters of the traces may be changed according to the one or more conditions that have been reached.

44 Claims, 8 Drawing Sheets

U.S. PATENT DOCUMENTS

| | | | |
|---|---|---|---|
| 6,553,564 | B1 | 4/2003 | Alexander, III et al. |
| 6,574,792 | B1 | 6/2003 | Easton |
| 6,598,012 | B1 | 7/2003 | Berry et al. |
| 6,654,749 | B1 | 11/2003 | Nashed |
| 6,658,652 | B1 | 12/2003 | Alexander, III et al. |
| 6,678,883 | B1 | 1/2004 | Berry et al. |
| 6,694,507 | B1 | 2/2004 | Arnold et al. |
| 6,708,173 | B1 | 3/2004 | Behr et al. |
| 6,715,140 | B1 | 3/2004 | Haga |
| 6,732,095 | B1 | 5/2004 | Warshavsky et al. |
| 6,738,778 | B1 | 5/2004 | Williamson et al. |
| 6,738,965 | B1 | 5/2004 | Webster |
| 6,748,583 | B1 | 6/2004 | Aizenbud-Reshef et al. |
| 6,751,753 | B1 * | 6/2004 | Nguyen et al. ............... 714/39 |
| 6,754,890 | B1 | 6/2004 | Berry et al. |
| 6,802,054 | B1 | 10/2004 | Faraj |
| 6,826,747 | B1 | 11/2004 | Augsburg et al. |
| 6,877,081 | B1 * | 4/2005 | Herger et al. ............... 711/170 |
| 2001/0011360 | A1 * | 8/2001 | Shigeta ....................... 714/724 |
| 2002/0004803 | A1 | 1/2002 | Serebrennikov |
| 2002/0016771 | A1 | 2/2002 | Carothers et al. |
| 2002/0019837 | A1 | 2/2002 | Balnaves |
| 2002/0066081 | A1 | 5/2002 | Duesterwald et al. |
| 2002/0073063 | A1 | 6/2002 | Faraj |
| 2002/0078143 | A1 | 6/2002 | De Boor et al. |
| 2002/0087592 | A1 | 7/2002 | Ghani |
| 2002/0087949 | A1 * | 7/2002 | Golender et al. ........... 717/124 |
| 2002/0095660 | A1 | 7/2002 | O'Brien et al. |
| 2002/0107882 | A1 | 8/2002 | Gorelick et al. |
| 2002/0120634 | A1 | 8/2002 | Min et al. |
| 2002/0120815 | A1 * | 8/2002 | Zahavi et al. ............... 711/118 |
| 2002/0133806 | A1 | 9/2002 | Flanagan et al. |
| 2002/0161672 | A1 | 10/2002 | Banks et al. |
| 2003/0088854 | A1 * | 5/2003 | Wygodny et al. ........... 717/130 |
| 2003/0140045 | A1 | 7/2003 | Heninger et al. |
| 2004/0158819 | A1 | 8/2004 | Cuomo et al. |
| 2004/0205718 | A1 | 10/2004 | Reynders |
| 2004/0216091 | A1 | 10/2004 | Groeschel |
| 2004/0216092 | A1 | 10/2004 | Ayers et al. |
| 2006/0130000 | A1 * | 6/2006 | Miyao et al. ............... 717/128 |

OTHER PUBLICATIONS

Tolujev, J. et al. "Assessment of Simulation Models Based on Trace-File Analysis: A Metamodeling Approach" IEEE Proceedings of the 1998 Winter Simulation Conference (1998) 1:443-450.

Helmbold, D.P. "Determining Possible Event Orders by Analyzing Sequential Traces" IEEE (Jul. 1993) 4(7):827-840.

Palnitkar, S. et al. "Finite State Machine Trade Analysis Program" IEEE (1994) pp. 52-57.

www.google.com, searched on Mar. 21, 2005 pp. 1-12, located at http://greenspun.com/seia/glossary.

IBM Technical Disclosure Bulletin "Checkref: Method for Effectively Identifying IBM Bookmaster Document Marukup Language Coding Errors" (Feb. 1994) pp. 379-392.

Agosti, Maristelle and Alan Smeaton. 1996. *Information Retrieval and Hypertext*. Boston: Kluwer Academic Publishers. ISBN 0-7923-9710-X.

Akscyn, Robert, Donald McCracken, and Elise Yoder. 1987. "KMS: A Distributed Hypermedia System for Managing Knowledge in Organizations." In *Proceedings of Hypertext '87*, Chapel Hill, NC. Nov. 13-15, 1987. NY: Association for Computing Machinery Press, pp. 1-20.

Berners-Lee, T. and L. Masinter, editors. Dec. 1994. "Uniform Resource Locators (URL)". IETF document RFC 17338.

Bradner, S. editor. Key words for use in RFCs to Indicate Requirement Levels. Mar. 1997, http://www.ietf.org/rfc/rfc2119.txt.

Bray, Tim, Dave Hollander, and Andrew Layman, editors. Namespaces in XML. Textuality, Hewlett-Packard, and Microsoft. World Wide Web Consortium, 1999, http://www.w3.org/TR/REC-xml-names/.

Bray, Tim, Jean Paoli, and C.M. Sperberg-McQueen, editors. Extensible Markup Language (XML) 1.0. World Wide Web Consortium, Oct. 2000, http://www.w3.org/TR/REC-xml.

Bush, Vannevar. 1945. "As We May Think." *Atlantic Monthly* 176 Jul. 1945, pp. 101-108.

Catano, James V. 1979. "Poetry and Computers: Experimenting with the Communal Text." In *Computers and the Humanities* 13 (9): pp. 269-275.

Chatterjee, Sunojit, "Trace Navigation and Analyzer Tool Prototype (High Level Design: First Draft)" Apr. 12, 2000.

Clark, James and Steve DeRose, editors. XML Path Language (XPath). World Wide Web Consortium, 1999, http://www.w3.org/TR/xpath.

Conklin, Jeff. 1987. "Hypertext: An Introduction and Survey." *IEEE Computer* 20 (9): pp. 17-41.

Cowan, John and David Megginson, editors. XML Information Set. World Wide Web Consortium, Dec. 1999, http://www.w3.org/TR/xml-infoset-19991220.

DeRose, Steve and Andries van Dam. 1999. "Document structure and markup in the FRESS Hypertext System." Markup Languages 1 (1) Winter. Cambridge: MIT Press: pp. 7-32.

DeRose, Steve, editor. XML XLink Requirements Version 1.0. Brown University. Seekonk: World Wide Web Consortium, 1999.

DeRose, Steve, editor. XML XPointer Language Requirements Version 1.0. World Wide Web Consortium, 1999. (See http://www.w3.org/TR/NOTE-xptr-req.).

DeRose, Steve, Eve Maler, David Orchard, and Ben Trafford, editors. XML Linking Language (XLink). World Wide Web Consortium, Dec. 2000. http://www.w3.org/TR/xlink/.

DeRose, Steven J. 1989. "Expanding the Notion of Links." In *Proceedings of Hypertext '89*, Pittsburgh, PA. NY: Association for Computing Machinery Press.

Document Object Model (DOM) Level 2 Specification: Version 1.0. World Wide Web Consortium, 1999. (See http://www.w3.org/TR/DOM-Level-2/.).

Dürst, Martin et al., eds. *"Character Model for the World Wide Web 1.0"*, World Wide Web Consortium, 2001. http://www.w3.org/TR/2001/WD-charmod-20010126/.

Engelbart, Douglas C. 1963. "A Conceptual Framework for the Augmentation of Man's Intellect". In *Vistas in Information Handling*, vol. 1 (P. Howerton, ed.). Washington, DC: Spartan Books: 1-29. reprinted in Greif, Irene (ed.), 1988. *Computer-Supported Cooperative Work: A Book of Readings*. San Mateo, California: Morgan Kaufmann Publishers, pp. 35-65. ISBN 0934613575.

Furuta, Richard, Frank M. Shipmann III, Catherine C. Marshall, Donald Brenner, and Hao-wei Hsieh. 1997. "Hypertext paths and the World-Wide Web: Experiences with Walden's Paths." In *Proceedings of Hypertext '97*. NY: Association for Computing Machinery Press.

Garrett, L. Nancy, Karen E. Smith, and Norman Meyrowitz. 1986. "Intermedia: Issues, Strategies, and Tactics in the Design of a Hypermedia System." In *Proceedings of the Conference on Computer-Supported Cooperative Work*.

Gibson, David, Jon Kleinberg, and Prabhakar Raghavan. 1998. "Inferring Web Communities from Link Topology." In *Proceedings of Hypertext '98*, Pittsburgh, PA. NY: Association for Computing Machinery Press.

Grønbæk, Kaj and Randall H. Trigg. 1996. "Toward a Dexter-based model for open hypermedia: Unifying embedded references and link objects." In Proceedings of Hypertext '96. NY: Association for Computing Machinery Press. Also available online.

Halasz, Frank. 1987. "Reflections on NoteCards: Seven Issues for the Next Generation of Hypermedia Systems." Address presented at Hypertext '87, Nov. 13-15, 1987. Reprinted in *Communications of the Association for Computing Machinery* 31 (7), Jul. 1988: 836-855.

Halasz, Frank. 1994. "The Dexter Hypertext Reference Model." In *Communications of the Association for Computing Machinery* 37 (2), Feb. 1994: 30-39.

Hall, Wendy, Hugh Davis, and Gerard Hutchings. 1996. *Rethinking Hypermedia: the Microcosm Approach*. Boston: Kluwer Academic Publishers. ISBN 0-7923-9679-0.

Hardman, Lynda, Dick C. A. Bulterman, and Guido van Rossum. 1994. "The Amsterdam Hypermedia Model: Adding Time and Context to the Dexter Model." In *Communications of the Association for Computing Machinery* 37.2 (Feb. 1994): 50-63.

Hinden, R., et al., "Format for Literal IPv6 Addresses in URL's." Internet Engineering Task Force, 1999. (See http://www.ietf.org/rfc/rfc2732.txt.).

ISO/IEC 10744-1992 (E). Information technology—Hypermedia/Time-based Structuring Language (HyTime). Geneva: International Organization for Standardization, 1992. Extended Facilities Annex. [Geneva]: International Organization for Standardization, 1996. (See http://www.ornl.gov/sgml/wg8/docs/n1920/html/n1920.html.).

Kahn, Paul. 1991. "Linking Together Books: Experiments in Adapting Published Material into Intermedia Documents." In Paul Delany and George P. Landow (eds), *Hypermedia and Literary Studies*. Cambridge: MIT Press.

Landow, George P. 1987. "Relationally Encoded Links and the Rhetoric of Hypertext." In *Proceedings of Hypertext '87*, Chapel Hill, NC, Nov. 13-15, 1987. NY: Association for Computing Machinery Press: 331-334.

Lassila, Ora and Ralph Swick, editors. Resource Description Framework (RDF) Model and Syntax Specification. World Wide Web Consortium, 1999. http://www.w3.org/TR/REC-rdf-syntax/.

Maler, Eve and Steve DeRose, editors. XML Linking Language (XLink) World Wide Web Consortium, Mar. 1998. http://www.w3.org/TR/1998/WD-xlink-199980303.

Marsh, Jonathan, editor. XML Base (XBase). World Wide Web Consortium, Dec. 1999. http://www.w3.org/TR/1999/WD-xmlbase-19991220.

Marshall, Catherine C., Frank M. Shipman, III, and James H. Coombs. 1994. "VIKI: Spatial Hypertext Supporting Emergent Structure". In *Proceedings of the 1994 European Conference on Hypertext*. NY: Association for Computing Machinery Press.

Meyrowitz, Norman. 1986. "Intermedia: the Architecture and Construction of an Object-Oriented Hypermedia system and Applications Framework." In *Proceedings of OOPSLA*. Portland, OR.

Nelson, Theodore H, "Literary Machines", Mindful Press, Sausalito, 1992.

Raggett, Dave et al., "HTML 4.01 Specification". World Wide Web Consortium, Dec. 1999. http://www.w3.org/TR/html4/.

Sperberg-McQueen C.M. and Lou Burnard, editors.Guidelines for Electronic Text Encoding and Interchange. Association for Computers and the Humanities (ACH), Association for Computational Linguistics (ACL), and Association for Literary and Linguistic Computing (ALLC). Chicago, Oxford: Text Encoding Initiative, 1994.

Trigg, Randall H. 1988. "Guided Tours and Tabletops: Tools for Communicating in a Hypertext Environment." In *ACM Transactions on Office Information Systems*, 6.4 (Oct. 1988): 398-414.

Trigg, Randall H. 1991. "From Trailblazing to Guided Tours: The Legacy of Vannevar Bush's Vision of Hypertext Use." In Nyce, James M. and Paul Kahn, eds, 1991, From Memex to Hypertext: Vannevar Bush and the Mind's Machine. San Diego: Academic Press, pp. 353-367. A thorough review.

van Ossenbruggen, Jacco, Anton Eliëns and Lloyd Rutledge. "The Role of XML in Open Hypermedia Systems." Position paper for the 4th Workshop on Open Hypermedia Systems, ACM Hypertext '98. http://aue.auc.dk/~kock/OHS-HT98/Papers/ossenbruggen.html.

Whitehead, E., "XML Media Types." Internet Engineering Task Force, Network Working Group, Jul. 1998. http://www.ietf.org/rfc/rfc2376.txt.

*XHTML 1.0: The Extensible HyperText Markup Language*. World Wide Web Consortium, Jan. 2000. (See http://www.w3.org/TR/2000/REC-xhtml1-20000126/.

Yankelovich, Nicole, Bernard J. Haan, Norman K. Meyrowitz, and Steven M. Drucker. 1988. "Intermedia: The Concept and the Construction of a Seamless Information Environment." *IEEE Computer* (Jan. 1988): 81-96.

Yankelovich, Nicole, Norman Meyrowitz, and Andries van Dam. 1985. "Reading and Writing the Electronic Book." *IEEE Computer* 18 (Oct. 1985): 1-30.

Yergeau, F., Network Working Group, "UTF-8, a transformation format of ISO 10646." Internet Engineering Task Force, 1998. http://www.ietf.org/rfc/rfc2279.txt.

Zellweger, Polle T. 1989. "Scripted Documents: A Hypermedia Path Mechanism." In *Proceedings of Hypertext '89*. NY: Association for Computing Machinery Press, Nov. 1989.

Biswas, P. et al. "Trace Driven Analysis of Write Caching Policies for Disks" *Proceedings of the 1993 ACM SIGMETRICS Conference on Measurement and Modeling of Computer Systems* (1993) pp. 13-23.

Borg, A. et al. "Generation and Analysis of Very Long Address Traces" *Proceedings of the 17th Annual International Symposium on Computer Architecture* (May 1990) 18(3):270-279.

Chang, P. P. and W.-M. W. Hwu "Trace Selection for Compiling Large C Application Programs to Microcode" *Proceedings of the 21st Annual Workshop on Microprogramming and Microarchitecture* (Jan. 1988) pp. 21-29.

Colby, C. and P. Lee "Trace-Based Program Analysis" *Proceedings of the 23rd ACM SIGPLAN-SIGACT Symposium on Principles of Programming Languages* (Jan. 1996) pp. 195-207.

Dan, A. et al. "Characterization of Database Access Pattern for Analytic Prediction of Buffer Hit Probability" *VLBD Journal* (1995) 4:127-154.

Ducassé, M. "Coca: An automated Debugger for C" *Proceedings of the 21st International Conference on Software Engineering* (May 1999) pp. 504-513.

Ezust, S.A. and G. v. Bochmann "An Automatic Trace Analysis Tool Generator for Estelle Specifications" *Proceedings of the Conference on Applications, Technologies, Architectures and Protocols for Computer Communication* (Oct. 1995) 25(4):175-184.

Goldszmidt, G. S. and S. Yemini "High-Level Language Debugging for Concurrent Programs" *ACM Transactions on Computer Systems (TOCS)* (Nov. 1990) 8(4):311-336.

Hsu, W. W. et al. "I/O Reference Behavior of Production Database Workloads and the TPC Benchmarks—An Analysis at the Logical Level" *ACM Transactions on Database Systems (TODS)* (Mar. 2001) 26(1):96-143.

LeDoux, C. H. and D. S. Parker, Jr. "Saving Traces for ADA Debugging" *Proceedings of the 1985 Annual ACM SIGAda International Conference on Ada* (May 1985) V(2):97-108.

Lencevicius, R. et al. "Third Eye—Specification-Based Analysis of Software Execution Traces" *Proceedings of the 22nd International Conference on Software Engineering* (Jun. 2000) p. 772.

Lo, J. L. et al. "An Analysis of Database Workload Performance on Simultaneous Multithreaded Processors" *Proceedings of the 25th Annual International Symposium on Computer Architecture* (Apr. 1998) 26(3):39-50.

Miller, B.P. and J.-D. Choi "A Mechanism for Efficient Debugging of Parallel Programs" *Proceedings of the ACM SIGPLAN 1998 Conference on Programming Language Design and Implementation* (Jun. 1988) pp. 135-144.

Putrycz, E. "Using Trace Analysis for Improving Performance in COTS Systems" *Proceedings of the 2004 Conference of the Centre for Advanced Studies on Collaborative Research* (Oct. 2004) pp. 1-13.

Rahm, E. "Empirical Performance Evaluation of Concurrency and Coherency Control Protocols for Database Sharing Systems" *ACM*

*Transactions on Database Systems* (*TODS*) (Jun. 1993) 18(2):333-337.

Ramakrishnan, K. K. "Analysis of File I/O Traces In Commercial Computing Environments" *Proceedings of the 1992 ACM SIGMETRICS Joint International Conference on Measurement and Modeling of Computer Systems* (Jun. 1992) 20(1):78-90.

Reiss, S.P. and M. Renieris "Generating Java Trace Data" *Proceedings of the ACM 2000 Conference on Java Grande* (Jun. 2000) pp. 71-77.

Singhal, V. and A J Smith "Analysis of locking behavior in three real database systems" *The VLDB Journal* (1997) 6:40-52.

Metalanguage, http://en.wikipedia.org/wiki/Meta-language, accessed on Feb. 2, 2006, pp. 1-3.

Webster, J. (ed). Wiley Encyclopedia of Electrical and Electronics Engineering, 1999, pp. 33-39, John Wiley & Sons, Inc., USA.

\* cited by examiner

Resource Statistics Table

| Resource ID | Failure Prone Thresholds | |
| --- | --- | --- |
| | Entry Value | Exit Value |
| R1 | 10 | 50 |
| R2 | 90 | n/a |
| R3 | 80 | 50 |
| ... | ... | ... |
| Rn | x | y |

400

Computer System State Table

| State ID | Condition | Trace Action |
| --- | --- | --- |
| S1 | R1(Entry Value) AND R2(Entry Value) | Start Trace 1 and stop Trace 5 |
| S2 | R1(Exit Value) and R2(Entry Value) | Stop Trace 1 and start Trace 4 |
| S3 | Rn(Entry Value) and R1(Exit Value) | Start Trace 2 and stop Trace 1 |
| S4 | Rn(Entry Value) and R2(Entry Value) | Stop Trace 5 and start Trace m |
| ... | ... | ... |
| Sz | Condition z | Trace Action z |

METHOD AND MECHANISM FOR MANAGING TRACES WITHIN A COMPUTER SYSTEM

BACKGROUND AND SUMMARY

Tracing is an approach for logging the state of computer applications at different points during its course of execution. Tracing is normally implemented by inserting statements in the computer application code that outputs status/state messages ("traces") as the statements are encountered during the execution of the code. Statements to generate traces are purposely placed in the computer application code to generate traces corresponding to activities of interest performed by specific sections of the code. The generated trace messages can be collected and stored during the execution of the application to form a trace log.

Programmers often use tracing and trace logs to diagnose problems or errors that arise during the execution of a computer application. When such a problem or error is encountered, trace logs are analyzed to correlate trace messages with the application code to determine the sequence, origin, and effects of different events in the systems and how they impact each other. This process allows analysis/diagnoses of unexpected behavior or programming errors that cause problems in the application code.

In order for this process to be effective, the traces must capture, and the trace logs must reflect, the problems or the events that cause the problems. If not, it may be necessary to try to reproduce the problems again but with more aggressive tracing until all the necessary information is collected in the trace logs. A problem with this approach is that repeated attempts to reproduce the problems can be time consuming. Frequently, the problems are difficult to reproduce, and a large number of attempts are required. To add to the difficulty, often times the problems occur on a computer system at a remote site. This may require having a programmer travel to that site, which can be expensive and even more time consuming. Alternatively, one may turn to a system administrator or user at the remote site for help, but this may also add to the difficulty because they may not be willing, and they may not be as adept to efficiently reproduce the problems and control the tracing.

Another approach is to enable detail tracing at all times in anticipation of problems or failure occurring, but this may consume excessive resources which can negatively affect the performance of the computer system and may fill the trace logs with non-useful information.

The present invention provides a method and mechanism for managing diagnostic traces within a computer system. According to an embodiment, a status indicator for a resource within the computer system is used to determine whether to start a trace. If the status indicator reaches a failure prone threshold, then the trace may be automatically started. If the status indicator falls outside of the failure prone threshold, then the trace may be automatically stopped.

According to another embodiment, status indicators for a plurality of resources within a computer system are used to determine whether to start a trace action. If a particular combination of status indicators reach their respective failure prone threshold values, then a corresponding trace action may be automatically invoked.

With these aspects of the invention, traces can be automatically managed to capture diagnostic data or problems occurring within a computing device. Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is disclosed in a number of different embodiments as methods and mechanisms for managing traces within a computer system.

Generally, a computer system, having one or more traces and one or more resources, may satisfy one or more conditions which, in response, it may be desirable to change or adapt certain characteristics, such as the trace control parameters, of the one or more traces. The one or more traces described herein may include, in addition to traces, mechanisms for tracing or systems that function within the scope of tracing, e.g., systems that log the timing or frequency of a particular event occurring during an application's course of execution. The characteristics may affect the properties of the one or more traces, e.g., they may stop, start, or adjust the detail level of the one or more traces. For example, a particular condition, if satisfied, may indicate that there is a likelihood of a problem occurring within the computer system. In such a situation, changing characteristics such as the parameters to start the one or more traces may be desirable. Such a condition may, for example, be based on the current status of the one or more resources, a historical perspective for the one or more resources—based on gathered historical data—or a combination of the two.

The present invention is disclosed in a number of different embodiments that generally provide methods and mechanisms for identifying one or more conditions and adapting the characteristics of the one or more traces in response to the one or more conditions being satisfied. Some of the embodiments disclosed are directed to conditions relating to problems occurring or the likelihood of problems occurring within the computer system. However, the principles presented here are equally applicable to other types of conditions, which in response, tracing may be desirable, and further, the principles are applicable to any computer system architecture, and thus the scope of the invention is not to be limited to the exact embodiments shown herein.

Figure 1:
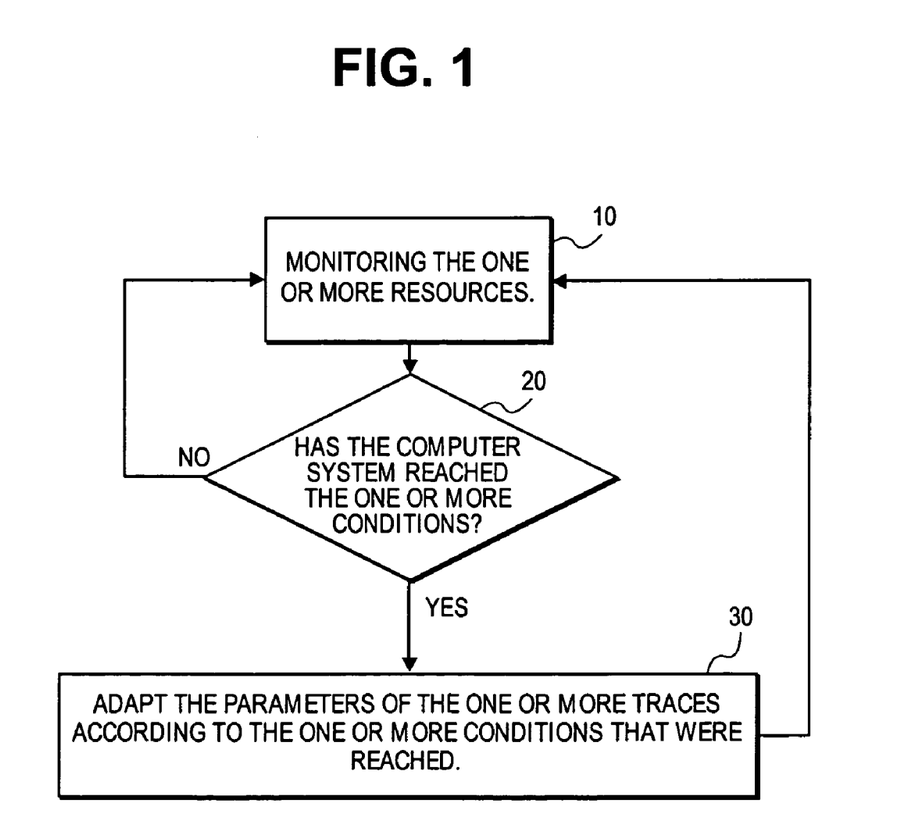
FIG. 1 is a flowchart of a process for managing one or more traces according to an embodiment of the invention.

Turning to FIG. 1, an operation flowchart of an embodiment in accordance with the present invention is shown. As mentioned above, a computer system, having one or more resources and one or more traces, may reach one or more conditions which, in response, it may be desirable to change the characteristics of the one or more traces, e.g., user definable trace control parameters. Generally, if the one or more conditions are reached, the one or more resources may react in response. Monitoring for the reaction of the one or more resources may anticipate that the one or more conditions have been reached. To take advantage of this anticipation, it may be desirable to monitor the status of the resources (action block 10) to determine if the computer system has reached the one or more conditions (decision block 20). This determination may be based on the current status of the resource. In addition, historical data may be collected during the monitoring process, and thus the determination may further be based on the historical perspective of the resource or a combination of both the current status and the historical perspective. If the computer system has reached the one or more conditions, then it may be desirable to change the characteristics of the one or more traces, e.g., adapt the trace control parameters, based upon the one or more conditions that have been satisfied (action block 30). As mentioned above, these characteristics or parameters may, for example, start/stop the traces and adjust the tracing detail level, e.g., low level detailed tracing or high level coarse tracing.

Figure 2:
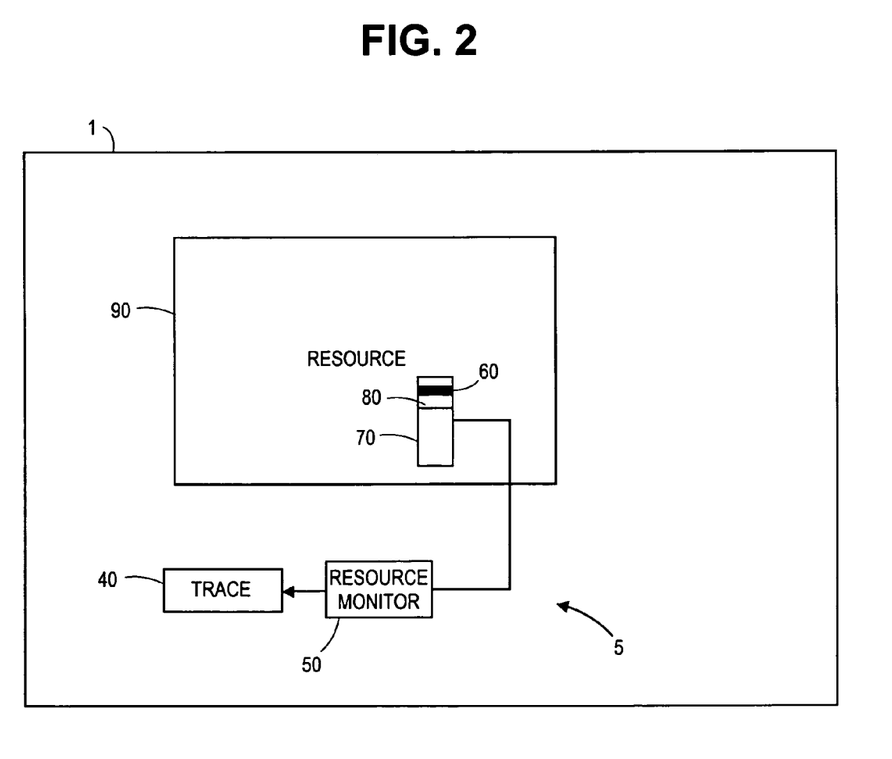
FIG. 2 is a diagram of a trace management system within a computer system, having a resource and a trace, according to an embodiment of the invention.

Turning to an embodiment of the invention, in FIG. 2, a trace management system (TMS) 5 is implemented using a computer system 1 having a resource 90 and a trace 40, which may be configured to trace the resource 90 or another component of the computer system 1. Generally, when a problem occurs within the computer system 1, the computer system 1 may reach a certain condition in which one or more resources 90 within the computer system 1 may react to the occurrence of the problem. Monitoring the resources 90 for this reaction may anticipate the occurrence of the problem. To take advantage of this anticipation, the TMS 5 monitors the status of the resources 90 to determine if the computer system 1 has reached the condition. Alternatively, an entity separate and/or independent from the TMS 5 may monitor the status of the resources 90. For example, such an entity may include an independent monitoring and resources-statistics collection program. If the computer system 1 has reached the condition, then this may indicate a likelihood of a problem occurring, or a likelihood that a problem is about to occur. The TMS 5, in response, may then automatically invoke the trace 40 to capture the problem in its trace logs and then continue to monitor the resource 90. If the problem subsides, the resource 90 may return back to its normal behavior. In response, the TMS 5 may automatically stop the trace 40 to conserve CPU cycles and memory space. This greatly increases the efficiency of the trace 40.

In the present embodiment, the TMS 5 includes a status indicator 70, having a gauge 80, coupled to the resource 90 that serves to gauge a particular property of the resource 90 that may act as an indicator of possible problems occurring within the computer system 1. The status indicator 70 further includes a failure prone threshold 60, which may be a range, an upper limit, a lower limit, and/or a boundary within the status indicator 70, defined such that when the gauge 80 reaches the threshold 30, then this indicates that there is a likelihood that a particular problem has occurred, or is likely to occur, within the computer system 1. The TMS 5 further includes a resource monitor 50 coupled to the trace 40, which monitors the status indicator 70. As mentioned above, the resource monitor 50 may alternatively be an entity independent and/or separate from the TMS 5.

Figure 3:
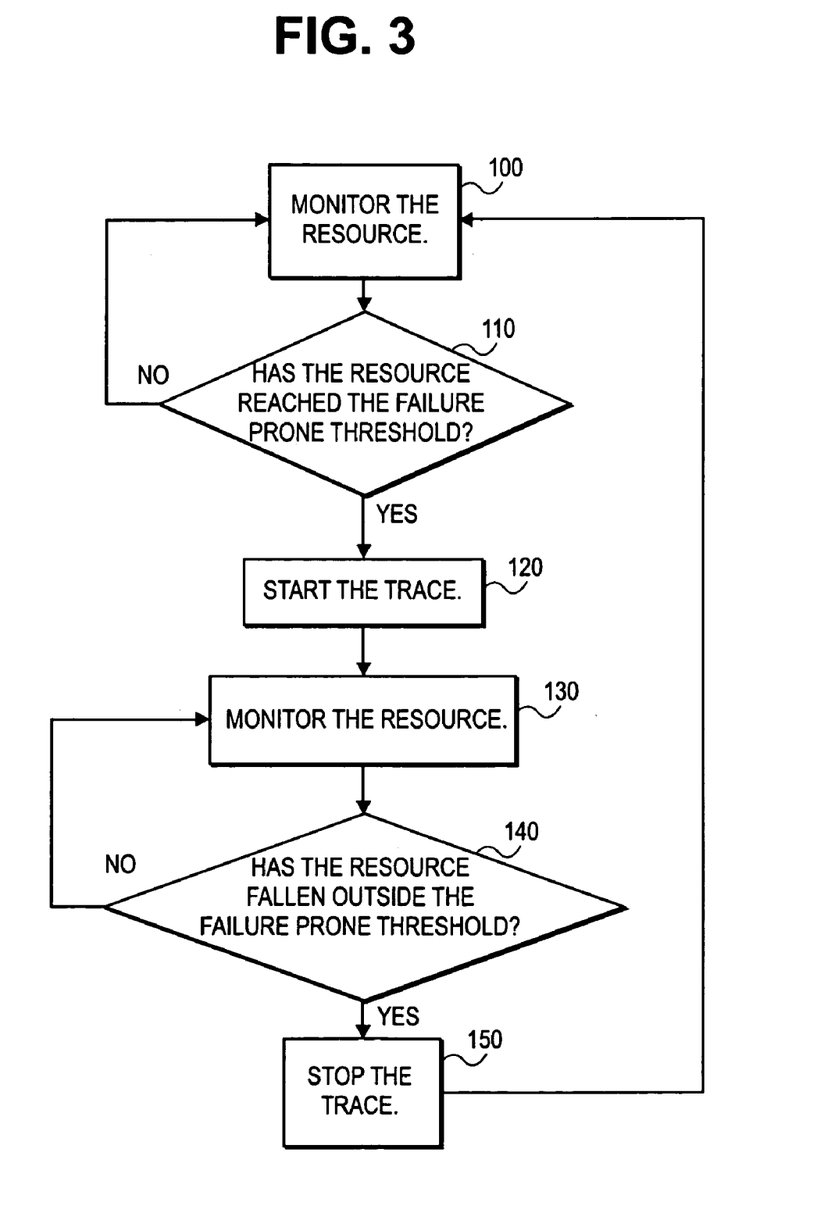
FIG. 3 is a flowchart of a process for managing a trace according to an embodiment of the invention.

Turning to FIG. 3, an operation flowchart of a TMS 5 is shown within a computer system 1 having at least one resource 90 and at least one trace 40. The resource monitor 50 monitors the status indicator 70 (action block 100), and if the gauge 80 of the status indicator 70 has reached the failure prone threshold 60 (decision block 110), then there is a likelihood that a problem has occurred, or will occur, within the computer system 1. In response, the resource monitor 50 invokes the trace 40 (action block 120). The failure prone threshold 60 may include an entry value and an exit value. If the status indicator 70 reaches the entry value, the computer system 1 has entered a failure prone state, and the trace 40 is invoked. If the status indicator 70 reaches the exit value, then this indicates that the problem may have subsided. Thus, the resource monitor 50 continues to monitor the status indicator 70 (action block 130). If the status indicator 70 falls outside of the failure prone threshold 60, i.e., reaches an exit value (decision block 140), then the trace 40 is automatically stopped (action block 150).

Turning to a specific example to illustrate the present embodiment, the computer system 1 may comprise a computer on a network with other computers. The resource 90 is a communication buffer that is used by the computer to temporarily store incoming data until the computer is ready to receive the data and outgoing data until the computer is ready to send the data out. If a problem on the network occurs, then the computer may not be able to send the outgoing data. As a result, the outgoing data may get queued up in the communication buffer, and the buffer's free memory space may diminish.

Using a TMS 5, in accordance with an embodiment of the present invention, the status indicator 70 may be configured to gauge the percentage of free memory space. The failure prone threshold 60 entry value may be established at 10%. Thus, if the gauge 80 of the status indicator 70 reaches 10%, then this indicates that the data in the communication buffer is not being moved, which may indicate a network problem. In response, the resource monitor 50 invokes the trace 40 to perform a trace on the network, to capture any problems on the network. In addition, an exit value for the failure prone threshold 30 may be established at 50%. Thus, if the gauge 25 reaches 50%, then this may indicate that the data started to move again, which may indicate that the network problem has been resolved. In such a case, the resource monitor 50 may stop the trace to conserve CPU cycles and memory space.

Figure 4:
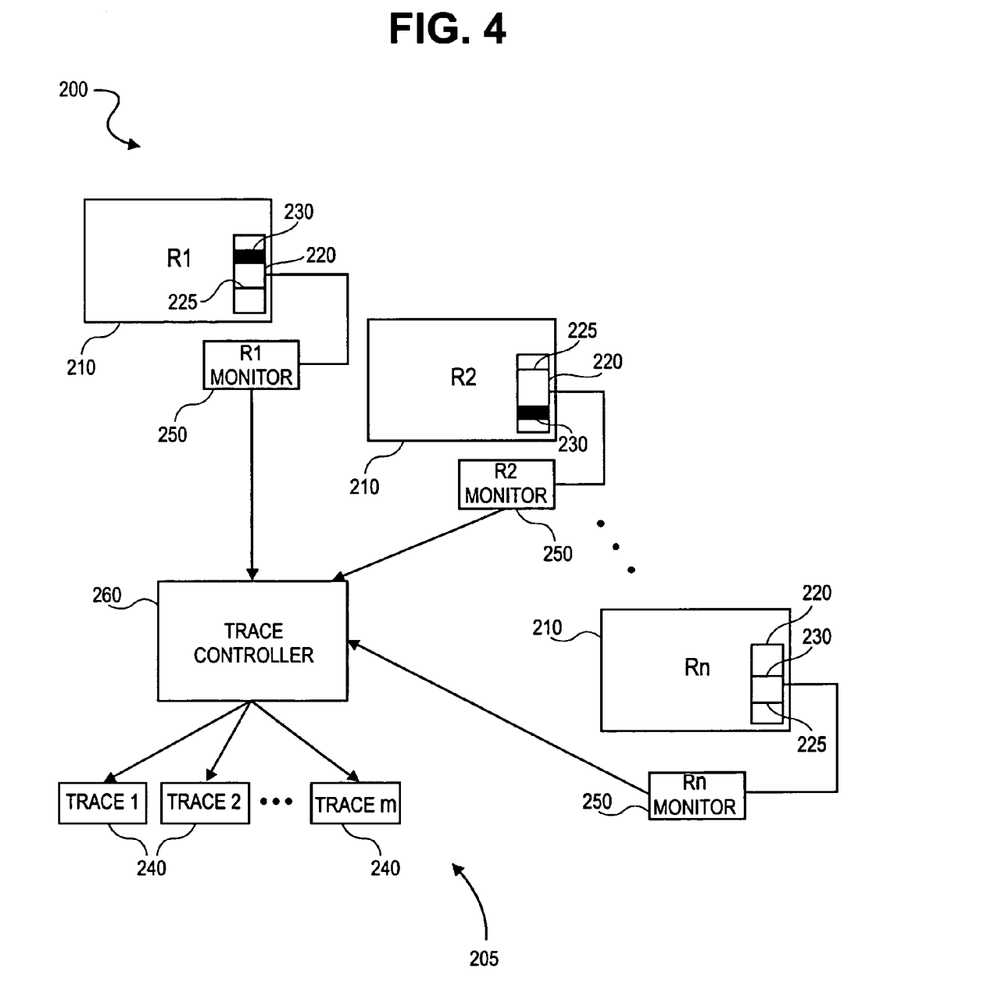
FIG. 4 is a diagram of an alternative trace management system within a computer system, having a plurality of resources and a plurality of traces, according to an embodiment of the invention.

Turning to FIG. 4, an alternative embodiment in accordance with the present invention is shown. In a computer system 200 with a large number of resources 210 and a large number of traces 240, problem solving can become much more complicated. Finding the correct trace 240, or correct combination of traces 240, to capture the problem can be a daunting task. As described above, when a particular problem occurs, a particular resource 210, or a particular combination of resources 210, may have a particular reaction to the occurrence of the problem. Thus, it may be desirable to monitor each of these resources 210 to facilitate determining the cause of the problem. Once that determination is made, the proper characteristics or parameters of the traces 240 can be set to effectively capture the problem, or problems. A TMS 205, in accordance with the present invention, may control a plurality of resources 210 and a plurality of traces 240, which may trace a resource 210 or another component, within a computer system 200.

In the present embodiment, the TMS 205 includes a status indicator 220, each having a gauge 225, associated with a resource 210 to be monitored, each indicator 220 having an established failure prone threshold 230. A resource monitor 250 is coupled to a resource 210 to monitor the respective status indicator 220. Alternatively, a single resource monitor 250 may monitor a plurality of resources 210 in accordance with the present invention (not shown), or the resource monitor 250 may be a separate and/or independent entity from the TMS 205. The resource monitor 250 may be an independent monitoring and resources-statistics collection program, for example. Further, historical data for a resource 210 may be recorded while the resource is being monitored, to facilitate determining the condition that the computer system 200 is in and to facilitate determining the state of the traces 240, e.g., whether a particular trace 240 is turned on, and if so, at what level. The TMS 205 further includes a trace controller 260, coupled to each resource monitor 250 and to each trace 240, configured to receive updates from the resource monitors 250 and manage the traces 240. In the alternative, the trace controller 260 itself may monitor the status indicators 220 without using the resource monitors 250, or the status indicators 220 may monitor themselves and update the trace controller 260 directly.

Figure 5:
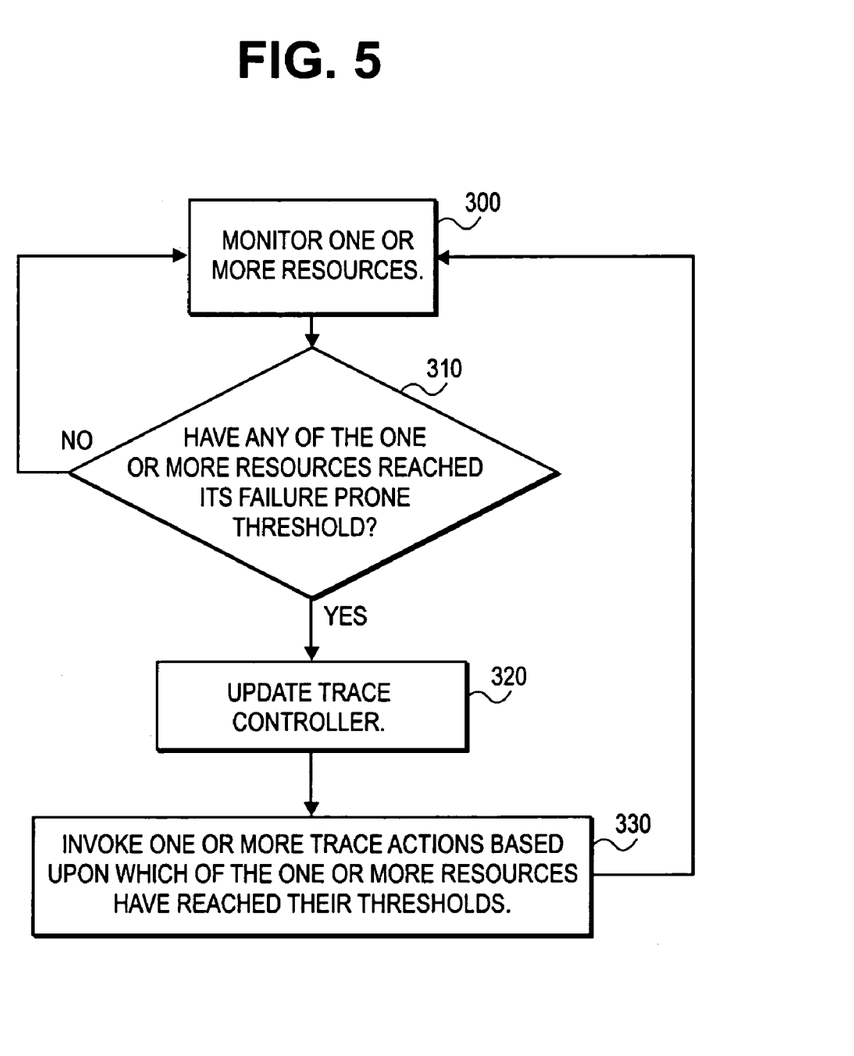
FIG. 5 is a flowchart of a process for managing one or more traces according to an embodiment of the invention.

Turning to FIG. 5, an operation flowchart of a TMS 205 within a computer system 200 having one or more resources 210 and one or more traces 240 is illustrated. The one or more resources 210 are monitored (action block 300) to determine whether a resource 210 has reached its failure prone threshold 230 or moved outside of its failure prone threshold 230 (decision block 310). If so, then the trace controller 260 is updated (action block 320). Given the information received, the trace controller 260 may determine which appropriate trace 240, or appropriate combination of traces 240, to utilize and at what level.

Figure 6:
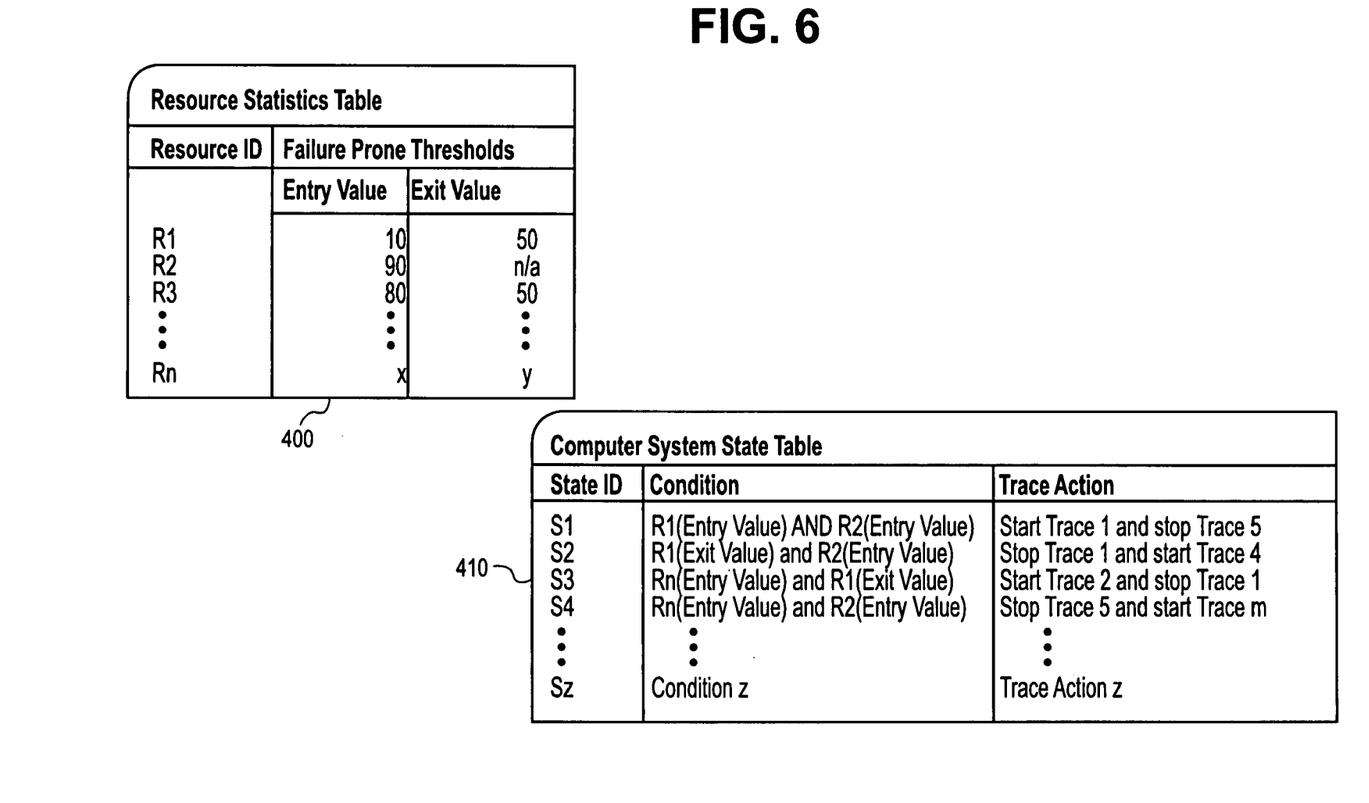
FIG. 6 is a diagram of statistics tables that may be used by a trace management system according to an embodiment of the invention.

In the present embodiment, to facilitate the control of the traces 240, one or more trace actions may be utilized, as illustrated in FIG. 6. A trace action includes an array of trace instructions that control the characteristics or parameters of the traces 240. Examples of instructions include "stop trace" and "start trace", and may also include parameters that indicate at what level a trace 240 may operate, e.g., low level detailed tracing or high level tracing. For example, a trace action may include: start trace 1, stop trace 2, and start trace 3 at a detailed level. The trace controller 260 may invoke one or more trace actions depending on the information it receives from the monitoring process (action block 330). After invoking the one or more trace actions, the resources 210 continue to be monitored (action block 300).

Turning to FIG. 6, management of the resources 210 and traces 240 may be facilitated in a specific embodiment of the invention by using statistical tables 400/410 in the trace controller 260. Turning to the Resource Statistics Table 400, each resource 210 has an associated resource identification (Resource ID), and the corresponding failure prone threshold 230 values are listed with the Resource ID in the table 400. In the present embodiment, the failure prone threshold 230 comprises an entry and exit value, but an exit value does not necessarily have to contain a particular value, for there may be situations when it is not desirable to have one. For example, R2 does not have an exit value. If the gauge 225 of the status indicator 220 for R2 reaches the entry value of its failure prone threshold 230, then this may indicate an irrecoverable problem occurring. Thus, no exit value exists for that resource 220.

Instead of having the resource monitors 250 notify the trace controller 260 of whether the gauge 225 of their associated status indicator 220 has reached the failure prone threshold 230, the resource monitor 250 can simply update the trace controller 260 with the current value of the status indicator 220. In turn, the trace controller 260 can then refer to the Resource Statistics Table 410 to determine whether the resource 210 has reached a failure prone threshold 230.

Another table used by the trace controller 260, in an embodiment, is a Computer System State Table 410. Generally, any number of conditions may occur within a computer system 200, which in response, it may be desirable to change the characteristics or parameters of the one or more traces 240. Each condition, or combination of conditions, may be identified by a particular state that the computer system 200 has reached, e.g. a failure prone state, and each of these states may be defined by the status of the resources 210 being monitored, e.g., the value of the status indicators 220. The Computer System State Table 410 lists a plurality of these states and associates an identification (State ID) with each one. In the present embodiment, each state is defined by a particular combination of status indicator 220 values relative to their respective failure prone threshold 230 values. For example, if the gauge 225 of R1's status indicator 220 has reached the entry value of its failure prone threshold 230 and the gauge 225 of R2's status indicator 220 has reached the entry value of its failure prone threshold 230, then the computer system 200 may then be at failure prone state S1.

Each of these states has an associated trace action, which, as described above, comprises an array of instructions that change the characteristics or parameters of the appropriate traces. In the example above, if the computer system 200 reached failure prone state S1, then the trace controller 260 would refer to the Computer System State Table 410 and invoke the appropriate trace action. In this case, the appropriate trace action would be to start Trace 1. It should be noted that any number of conditions may be reached in the computer system 200 concurrently, and thus, the computer system 200 may enter into a number of different states concurrently. In such a situation, the trace controller 260 may invoke all the appropriate trace actions, but if a conflict arises between different trace actions, an algorithm to determine which trace action prevails or whether a default trace action prevails may be included.

Turning to a specific example, a computer system 200 may comprise of a plurality of computers connected together via a network having a plurality of network nodes and a trace 240 coupled to each node. Each computer may have a communication buffer to store its incoming and outgoing data. One approach to implement the TMS 200 is to have a status indicator 220 coupled to each communication buffer 210 that gauges the amount of free memory space within the buffer 210. The failure prone threshold 230 for each buffer 210 includes an entry value at 10% free memory space and an exit value at 50% free memory space. A resource monitor 250 is coupled to each status indicator 220 and also coupled to a trace controller 260. The trace controller 260 is further coupled to each trace 240.

If the gauge 225 of a status indicator 220 reaches the entry value of a failure prone threshold 230, this indicates that the free memory space is low and that the incoming and outgoing data are not moving. This may indicate that there is a problem with a particular network node. Turning to FIG. 6, using a Resource Statistics Table 400, each communication buffer 210 can be assigned a Resource ID, each having a corresponding entry value of 10% and a corresponding exit value of 50%. The trace controller 260 can then receive updates from the resource monitors 250 and refer to the Resource Statistics Table 400 to determine whether a status indicator 220 of a communication buffer 210 has reached its failure prone threshold 230.

Then, using a Computer System State Table 410, every combination of status indicators 220 that have reached a failure prone threshold 230 value can be assigned a particular failure prone state with a State ID, each state having an associated trace action. Each trace action includes instructions on which network node traces 240 to start and which ones to stop. If communication buffer, R1, has only 10% of free memory space, but all the other communication buffers have normal free memory space, then this may indicate that the network node corresponding to the Trace 1 mechanism 240 may have a problem, and thus the only trace 240 that needs to be started is the Trace 1 mechanism. The entry into the Computer System State Table 410 would look something like this:

| State ID | Condition | Trace Action |
| --- | --- | --- |
| S1 | R1(Entry Value) | Start Trace 1 mechanism. |

System Architecture Overview

Figure 7:
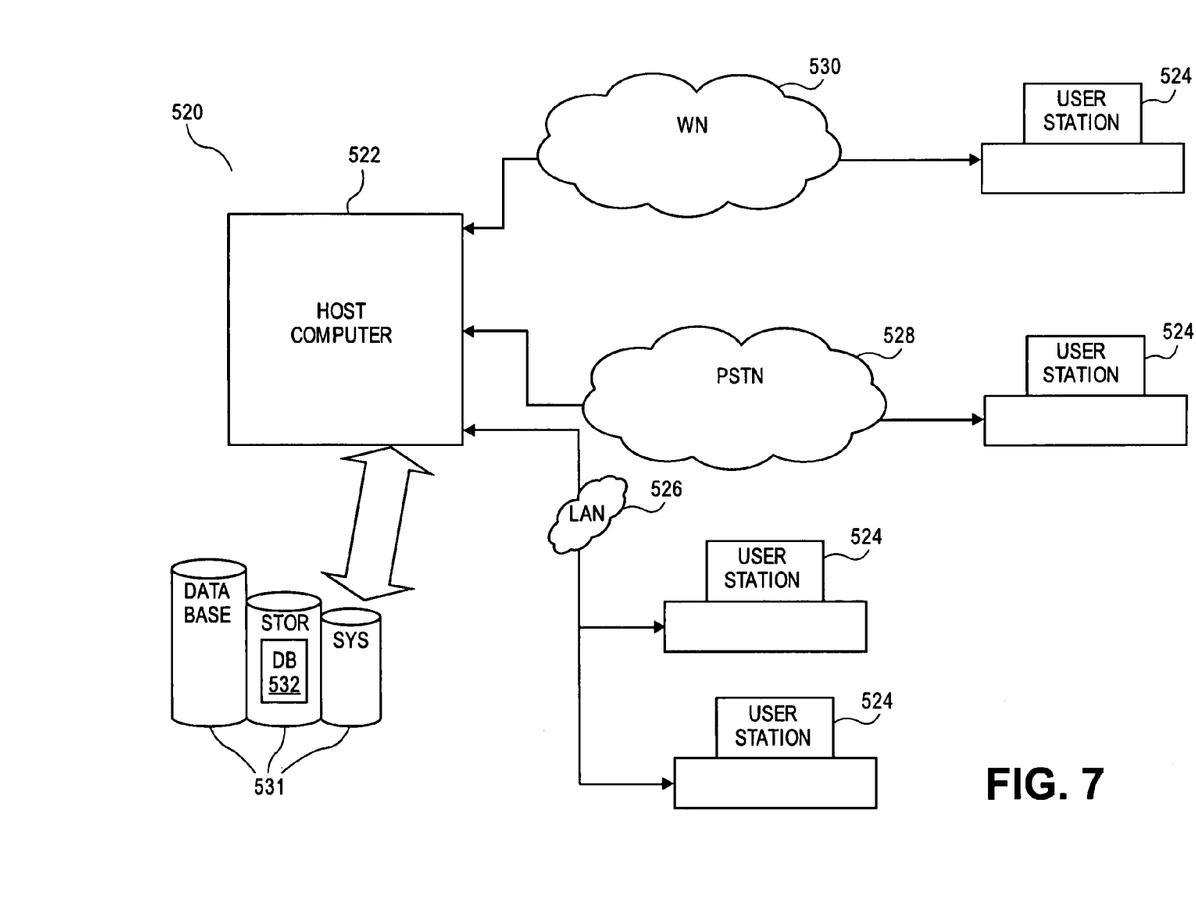
FIGS. 7 and 8 are diagrams of system architectures with which the present invention may be implemented.

Referring to FIG. 7, an embodiment is implemented using a computer system 520, which includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 526. Other user stations 524 are remotely connected to the host computer 522 via a public telephone switched network ("PSTN") 528 and/or a wireless network 530.

In an embodiment, the host computer 522 operates in conjunction with a data storage system 531, wherein the data storage system 531 contains a database 532 that is readily accessible by the host computer 522. Note that a multiple tier architecture can be employed to connect user stations 524 to a database 532, utilizing for example, a middle application tier (not shown). In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 522 can access two or more databases 532, stored in a variety of mediums, as previously discussed.

Figure 8:
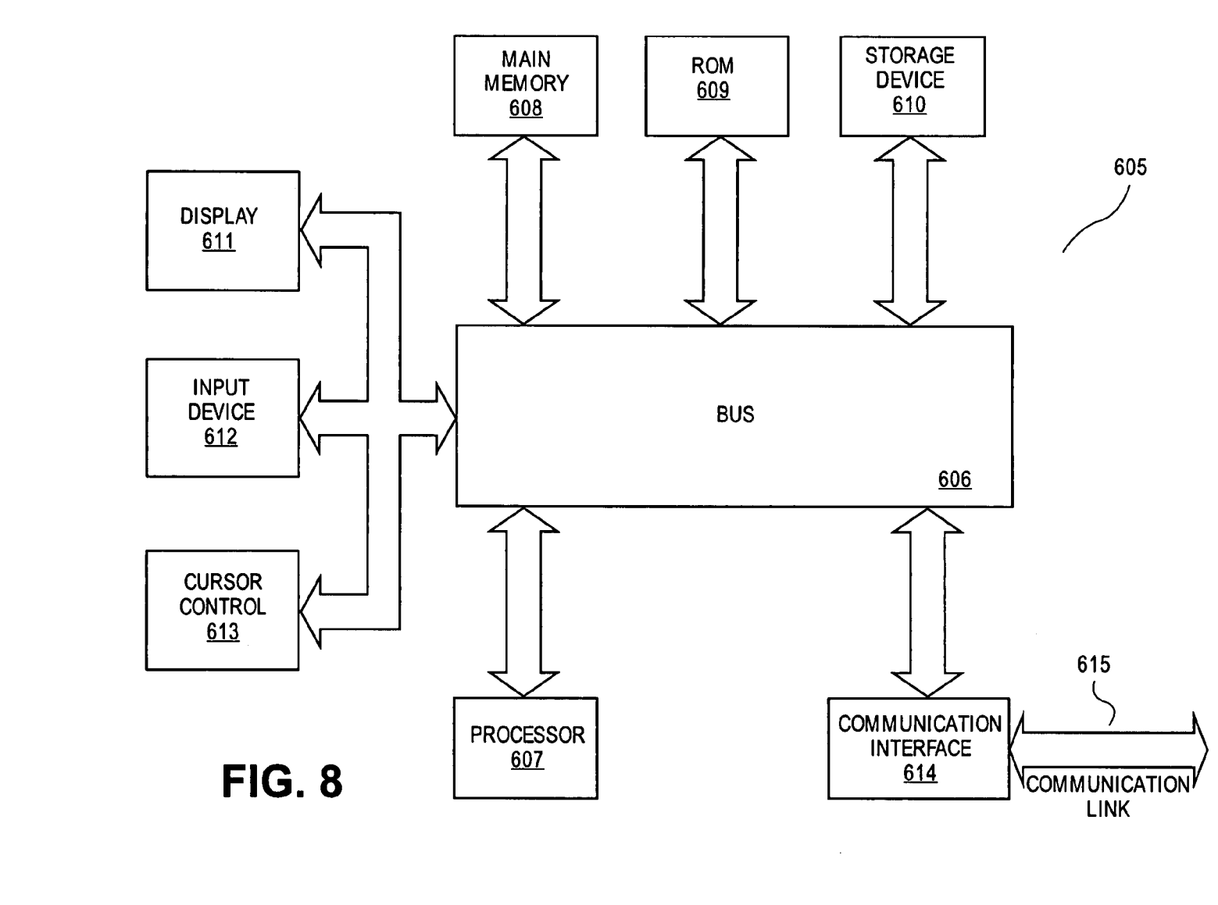

Referring to FIG. 8, in an embodiment, each user station 524 and the host computer 522, each referred to generally as a processing unit, embodies a general architecture 605. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607. A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A processing unit may be coupled via the bus 606 to a display device 611, such as, but not limited to, a cathode ray tube (CRT), for displaying information to a user. An input device 612, including alphanumeric and other columns, is coupled to the bus 606 for communicating information and command selections to the processor(s) 607. Another type of user input device may include a cursor control 613, such as, but not limited to, a mouse, a trackball, a fingerpad, or cursor direction columns, for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 409 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile, volatile and transmission media. Non-volatile media, i.e., media that can retain information in the absence of power, includes the ROM 409. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 607 can retrieve information. Various forms of computer-usable media may be involved in providing one or more sequences of one or more instructions to the processor(s) 607 for execution. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 624 and the host computer 622. The communication interface 614 of a respective processing unit transmits and receives electrical, electromagnetic or optical signals that include data streams representing various types of information, including instructions, messages and data. A communication link 615 links a respective user station 624 and a host computer 622. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 615 may be a wireless network 530. A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A process of managing one or more diagnostic traces within a computer system having one or more resources used for executing computer software code, the processing comprising:
   identifying one or more conditions for the computer system;
   monitoring the one or more resources occupied by one or more computer applications other than said process for managing traces to determine whether the one or more conditions have been satisfied; and
   changing characteristics of the one or more traces according to the one or more conditions that have been satisfied to aid diagnosing problems or errors within said computer system caused by said one or more other computer applications.

2. The process of claim 1, wherein the one or more conditions are failure prone conditions that indicate whether a problem is likely to occur within the computer system.

3. The process of claim 1, wherein the one or more traces have different levels of tracing and wherein the changing comprises:
   starting the one or more traces according to the one or more conditions that have been satisfied;
   stopping the one or more traces according to the one or more conditions that have been satisfied; and
   adjusting level of tracing according to the one or more conditions that have been satisfied.

4. The process of claim 1, wherein the one or more conditions are based upon a historical perspective of the one or more resources.

5. The process of claim 1, wherein the one or more conditions are not associated with a frequency in which the computer software code is executed.

6. The process of claim 1, wherein the one or more conditions are associated with free memory space.

7. The process of claim 1, further comprising diagnosing a problem within the computer system based on a status/state indicated by the one or more traces.

8. The process of claim 1, wherein the one or more traces indicate a status/state of the computer system during execution of the computer software code.

9. The process of claim 1, wherein the one or more traces are created by statements inserted within the computer software code.

10. A process of managing one or more diagnostic traces within a computer system having one or more resources used for executing computer software code, the process comprising:
    establishing one or more status indicators for the one or more resources occupied by one or more computer applications other than said process for managing traces that gauges a particular property of the one or more resources to indicate when there is a likelihood of a problem occurring within the computer system;
    establishing a failure prone threshold for each status indicator; and
    initiating one or more corresponding trace actions in response to which of the status indicators have reached their respective failure prone thresholds to aid diagnosing problems or errors within said computer system caused by said one or more other computer applications.

11. The process of claim 10, further comprising monitoring the status indicators to determine whether any of the status indicators have reached their respective failure prone thresholds.

12. The process of claim 10, wherein the one or more corresponding trace actions comprises a combination of start and stop instructions for the traces.

13. The process of claim 10, wherein the one or more conditions are not associated with a frequency in which the computer software code is executed.

14. The process of claim 10, wherein the one or more conditions are associated with free memory space.

15. The process of claim 10, further comprising diagnosing a problem within the computer system based on a status/state indicated by the one or more traces.

16. The process of claim 10, wherein the one or more traces indicate a status/state of the computer system during execution of the computer software code.

17. The process of claim 10, wherein the one or more traces are created by statements inserted within the computer software code.

18. A system for managing one or more diagnostic traces within a computing device having one or more resources used for executing computer software code, comprising:
    one or more status indicators configured for gauging a particular property of the one or more resources occupied by one or more computer applications other than said process for managing traces to indicate when one or more conditions have been reached within a computer system, each of the one or more status indicators having a value and a threshold, such that when the values of the one or more status indicators have reached the thresholds of the one or more status indicators, then the one or more conditions have been reached;

one or more resource monitors, coupled with the one or more status indicators, configured for monitoring the one or more status indicators; and a trace controller, coupled within the one or more traces and coupled within the one or more resource monitors, configured for receiving updates from the one or more resource monitors and for initiating one or more trace actions depending upon whether the values of the one or more status indicators have reached the threshold of the one or more status indicators to aid diagnosing problems or errors within said computer system caused by said one or more other computer applications.

19. The system of claim 18, wherein the one or more trace actions comprise a combination of start instructions and stop instructions for the one or more traces.

20. The system of claim 18, wherein the one or more conditions are failure prone conditions, such that when the one or more conditions have been reached, there is a likelihood of a problem occurring within the computer system.

21. The system of claim 18, wherein the trace controller comprises a computer system state table, listing one or more entries, each entry comprising:

a state for each of a combination of values of the one or more status indicators that have reached their respective thresholds; and the one or more trace actions associated with each state.

22. The system of claim 18, further comprising a resource statistics table, listing one or more entries, each entry comprising:

a resource identification for the one or more resources; and the corresponding thresholds associated with each resource.

23. The system of claim 18, wherein the one or more conditions are not associated with a frequency in which the computer software code is executed.

24. The system of claim 18, wherein the one or more conditions are associated with free memory space.

25. The system of claim 18, further comprising means for diagnosing a problem within the computer system based on a status/state indicated by the one or more traces.

26. The system of claim 18, wherein the one or more traces indicate a status/state of the computer system during execution of the computer software code.

27. The system of claim 18, wherein the one or more traces are created by statements inserted within the computer software code.

28. A computer program product that includes a computer-usable storage medium having a sequence of instructions which, when executed by a processor, causes the processor to execute a process for managing one or more diagnostic traces within a computer system having one or more resources used for executing computer software code, the process comprising:

establishing one or more conditions for the computer system;

monitoring the one or more resources occupied by one or more computer applications other than said process for managing traces to determine whether the one or more conditions have been satisfied; and changing characteristics of the one or more traces according to the one or more conditions that have been satisfied to aid diagnosing problems or errors within said computer system caused by said one or more other computer applications.

29. The computer program product of claim 28, wherein the one or more conditions are failure prone conditions that indicate whether a problem is likely to occur within the computer system.

30. The computer program product of claim 28, wherein the one or more traces have different levels of tracing and wherein the trace characteristic changing comprises:

starting the one or more traces according to the one or more conditions that have been satisfied;

stopping the one or more traces according to the one or more conditions that have been satisfied; and adjusting level of tracing according to the one or more conditions that have been satisfied.

31. The computer program product of claim 28, wherein the one or more conditions are based upon a historical perspective of the one or more resources.

32. The computer software product of claim 28, wherein the one or more conditions are not associated with a frequency in which the computer software code is executed.

33. The computer software product of claim 28, wherein the one or more conditions are associated with free memory space.

34. The computer software product of claim 28, wherein the process further comprises diagnosing a problem within the computer system based on a status/state indicated by the one or more traces.

35. The computer software product of claim 28, wherein the one or more traces indicate a status/state of the computer system during execution of the computer software code.

36. The computer software product of claim 28, wherein the one or more traces are created by statements inserted within the computer software code.

37. A computer program product that includes a computer-usable storage medium having a sequence of instructions which, when executed by a processor, causes the processor to execute a process for managing a one or more diagnostic traces within a computer system having a one or more resources used for executing computer software code, the process comprising:

establishing one or more status indicators for the one or more resources occupied by one or more computer applications other than said process for managing traces that gauges a particular property of the one or more resources to indicate when there is a likelihood of a problem occurring within the computer system;

establishing a failure prone threshold for each status indicator; and initiating one or more corresponding trace actions in response to which of the status indicators have reached their respective failure prone thresholds to aid diagnosing problems or errors within said computer system caused by said one or more other computer applications.

38. The computer program product of claim 37, further comprising monitoring the status indicators to determine whether any of the status indicators have reached their respective failure prone thresholds.

39. The computer program product of claim 37, wherein the one or more corresponding trace actions comprises a combination of start and stop instructions for the traces.

40. The computer software product of claim 37, wherein the one or more conditions are not associated with a frequency in which the computer software code is executed.

41. The computer software product of claim 37, wherein the one or more conditions are associated with free memory space.

42. The computer software product of claim 37, wherein the process further comprises diagnosing a problem within the computer system based on a status/state indicated by the one or more traces.

43. The computer software product of claim 37, wherein the one or more traces indicate a status/state of the computer system during execution of the computer software code.

44. The computer software product of claim 37, wherein the one or more traces are created by statements inserted within the computer software code.

* * * * *